(12) United States Patent
Wan et al.

(10) Patent No.: US 10,534,222 B2
(45) Date of Patent: *Jan. 14, 2020

(54) TECHNIQUES FOR DUAL MODULATION WITH LIGHT CONVERSION

(71) Applicant: DOLBY LABORATORIES LICENSING CORPORATION, San Francisco, CA (US)

(72) Inventors: Chun Chi Wan, Campbell, CA (US); Ajit Ninan, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/416,137

(22) Filed: May 17, 2019

(65) Prior Publication Data

US 2019/0278137 A1    Sep. 12, 2019

Related U.S. Application Data

(63) Continuation of application No. 16/169,970, filed on Oct. 24, 2018, now Pat. No. 10,295,863, which is a
(Continued)

(51) Int. Cl.
*G06F 3/038* (2013.01)
*G02F 1/13357* (2006.01)
*G09G 3/34* (2006.01)

(52) U.S. Cl.
CPC ..... *G02F 1/133609* (2013.01); *G09G 3/3426* (2013.01); *G02F 2001/133601* (2013.01);
(Continued)

(58) Field of Classification Search
CPC ............ H05B 33/0815; H05B 33/0818; H05B 41/2828; H05B 41/3921; H05B 41/3927;
(Continued)

(56) References Cited

U.S. PATENT DOCUMENTS 5,737,045 A    4/1998    Abileah
5,754,159 A    5/1998    Wood
(Continued)

FOREIGN PATENT DOCUMENTS

CN    1605041    4/2005
CN    1732717    2/2006
(Continued)

OTHER PUBLICATIONS

Green, Kate, "How Quantum Dots Will Make LCDs Better", Dec. 9, 2009, QD Vision.
(Continued)

*Primary Examiner* — Minh D A (57) ABSTRACT

Techniques for driving a dual modulation display include generating backlight drive signals to drive individually-controllable illumination sources. The illumination sources emit first light onto a light conversion layer. The light conversion layer converts the first light, such as blue or ultraviolet light, into second light, such as white light. The light conversion layer can include quantum dot materials. Liquid crystal display (LCD) modulation drive signals are generated to determine transmission of the second light through individual color subpixels of the display. These LCD modulation drive signals can be adjusted based on one or more light field simulations to account for non-uniform, spatial color shifts. Alternatively, one or more light field simulations based on a uniformity assumption determine intermediate LCD modulation drive signals. A compensation field simulation, using backlight drive signals, is then used to adjust the intermediate LCD modulation drive signal for color correction.

10 Claims, 5 Drawing Sheets

Related U.S. Application Data continuation of application No. 15/726,199, filed on Oct. 5, 2017, now Pat. No. 10,133,120, which is a continuation of application No. 15/505,432, filed as application No. PCT/US2015/046074 on Aug. 20, 2015, now Pat. No. 9,810,944.

(60) Provisional application No. 62/040,352, filed on Aug. 21, 2014.

(52) U.S. Cl.
CPC ............ *G02F 2001/133614* (2013.01); *G02F 2202/36* (2013.01); *G09G 2320/0233* (2013.01); *G09G 2320/0242* (2013.01); *G09G 2320/041* (2013.01); *G09G 2320/0646* (2013.01)

(58) Field of Classification Search
CPC .. H05B 37/029; H05B 37/02; H05B 37/0254; H05B 33/0803; H05B 41/28; F21Y 2101/02
See application file for complete search history.

(56) References Cited

U.S. PATENT DOCUMENTS

| | | | |
|---|---|---|---|
| 5,774,257 A | 6/1998 | Shibata | |
| 6,031,328 A | 2/2000 | Nakamoto | |
| 6,470,115 B1 | 10/2002 | Yonekubo | |
| 6,608,439 B1 | 8/2003 | Sokolik | |
| 6,864,626 B1 | 3/2005 | Weiss | |
| 7,048,427 B2 | 5/2006 | Fujino | |
| 7,126,254 B2 | 10/2006 | Nanataki | |
| 7,230,603 B2 | 6/2007 | Yamamoto | |
| 7,465,104 B2 | 12/2008 | Tokui | |
| 7,486,854 B2 | 2/2009 | Van Ostrand | |
| 7,498,534 B2 | 3/2009 | Hoyle | |
| 7,649,594 B2 | 1/2010 | Kim | |
| 7,686,493 B2 | 3/2010 | Roshan | |
| 7,696,684 B2 | 4/2010 | Weiss | |
| 7,746,423 B2 | 6/2010 | Im | |
| 7,751,663 B2 | 7/2010 | Van Ostrand | |
| 7,768,023 B2 | 8/2010 | Diana | |
| 7,858,409 B2 | 12/2010 | Kessels | |
| 7,982,812 B2 | 7/2011 | Rho | |
| 7,988,311 B2 | 8/2011 | Helbing | |
| 8,026,661 B2 | 9/2011 | Weiss | |
| 8,035,772 B2 | 10/2011 | Kim | |
| 8,075,148 B2 | 12/2011 | Nada | |
| 8,164,820 B2 | 4/2012 | Cho | |
| 8,210,701 B2 | 7/2012 | Igarashi | |
| 8,215,815 B2 | 7/2012 | Meir | |
| 8,242,679 B2 | 8/2012 | Noh | |
| 8,294,168 B2 | 10/2012 | Park | |
| 9,810,944 B2 * | 11/2017 | Wan | G09G 3/3426 |
| 10,133,120 B2 * | 11/2018 | Wan | G09G 3/3426 |
| 10,295,869 B2 * | 5/2019 | Kim | G02F 1/133345 |
| 2004/0061708 A1 | 4/2004 | Oh | |
| 2005/0093813 A1 | 5/2005 | Yamamoto et al. | |
| 2006/0104058 A1 | 5/2006 | Chemel | |
| 2006/0109682 A1 | 5/2006 | Ko | |
| 2006/0121371 A1 | 6/2006 | Chung | |
| 2006/0238103 A1 | 10/2006 | Choi | |
| 2006/0244367 A1 | 11/2006 | Im | |
| 2007/0008458 A1 | 1/2007 | Tokui et al. | |
| 2007/0029560 A1 | 2/2007 | Su | |
| 2007/0096141 A1 | 5/2007 | Chen | |
| 2007/0139449 A1 | 6/2007 | Bergquist | |
| 2007/0171186 A1 | 7/2007 | Chang | |
| 2007/0268240 A1 | 11/2007 | Lee | |
| 2008/0007172 A1 | 1/2008 | Tan | |
| 2008/0136758 A1 | 6/2008 | Ohta | |
| 2008/0172197 A1 | 7/2008 | Skipor | |
| 2008/0180466 A1 | 7/2008 | Whitehead et al. | |
| 2008/0215279 A1 | 9/2008 | Salsbury | |
| 2008/0225520 A1 | 9/2008 | Garbus | |
| 2009/0039448 A1 | 2/2009 | Chuang | |
| 2009/0059554 A1 | 3/2009 | Skipor | |
| 2009/0091689 A1 | 4/2009 | Rho | |
| 2009/0109517 A1 | 4/2009 | Cho et al. | |
| 2009/0116232 A1 | 5/2009 | Chang | |
| 2009/0162011 A1 | 6/2009 | Coe-Sullivan | |
| 2009/0180055 A1 | 7/2009 | Kim | |
| 2009/0190095 A1 | 7/2009 | Ellinger | |
| 2009/0194774 A1 | 8/2009 | Huang | |
| 2009/0196014 A1 | 8/2009 | Hsiao | |
| 2009/0213294 A1 | 8/2009 | Jung | |
| 2009/0231831 A1 | 9/2009 | Hsiao | |
| 2009/0285478 A1 | 11/2009 | Thiebaud | |
| 2009/0311939 A1 | 12/2009 | Elliott | |
| 2009/0322800 A1 | 12/2009 | Atkins | |
| 2010/0020242 A1 | 1/2010 | Lammers | |
| 2010/0079704 A1 | 4/2010 | Cho | |
| 2010/0084674 A1 | 4/2010 | Paetzold | |
| 2010/0102251 A1 | 4/2010 | Ferrini et al. | |
| 2010/0102340 A1 | 4/2010 | Ooya | |
| 2010/0110098 A1 | 5/2010 | Wang | |
| 2010/0117997 A1 | 5/2010 | Haase | |
| 2010/0123839 A1 | 5/2010 | Lu | |
| 2010/0155749 A1 | 6/2010 | Chen | |
| 2010/0172138 A1 | 7/2010 | Richardson | |
| 2010/0177091 A1 | 7/2010 | Hioki | |
| 2010/0193806 A1 | 8/2010 | Byun | |
| 2010/0208172 A1 | 8/2010 | Jang | |
| 2010/0208493 A1 | 8/2010 | Choi | |
| 2010/0214282 A1 | 8/2010 | Whitehead | |
| 2010/0246160 A1 | 9/2010 | Ito | |
| 2010/0283036 A1 | 11/2010 | Coe-Sullivan | |
| 2010/0283072 A1 | 11/2010 | Kazlas | |
| 2010/0309217 A1 | 12/2010 | Greenebaum | |
| 2011/0089809 A1 | 4/2011 | Noh | |
| 2011/0122170 A1 | 5/2011 | Kim | |
| 2011/0205251 A1 | 8/2011 | Auld | |
| 2011/0273495 A1 | 11/2011 | Ward | |
| 2011/0299011 A1 | 12/2011 | Weiss | |
| 2011/0312116 A1 | 12/2011 | Weiss | |
| 2011/0317097 A1 | 12/2011 | Kim | |
| 2012/0050632 A1 | 3/2012 | Shih | |
| 2012/0062607 A1 | 3/2012 | Erinjippurath | |
| 2012/0074851 A1 | 3/2012 | Erinjippurath | |
| 2012/0075435 A1 | 3/2012 | Hovanky | |
| 2012/0113672 A1 | 5/2012 | Dubrow | |
| 2012/0154417 A1 | 6/2012 | Ninan | |
| 2012/0154464 A1 | 6/2012 | Ninan | |
| 2012/0274882 A1 | 11/2012 | Jung | |
| 2013/0050293 A1 | 2/2013 | Feng | |
| 2013/0100692 A1 | 4/2013 | Yokobayashi | |
| 2013/0120678 A1 | 5/2013 | Chao | |
| 2013/0201661 A1 | 8/2013 | Mehrle | |
| 2013/0208508 A1 | 8/2013 | Nichol | |
| 2013/0215136 A1 | 8/2013 | Jiao | |
| 2013/0293596 A1 | 11/2013 | Atkins | |
| 2013/0335677 A1 | 12/2013 | You | |
| 2014/0043847 A1 | 2/2014 | Yang | |
| 2014/0126180 A1 | 5/2014 | Ninan | |
| 2014/0231788 A1 | 8/2014 | Krall | |
| 2016/0027368 A1 | 1/2016 | Guo et al. | |

FOREIGN PATENT DOCUMENTS

| | | |
|---|---|---|
| CN | 1854857 | 11/2006 |
| CN | 101243557 | 8/2008 |
| CN | 101484841 | 7/2009 |
| CN | 101512697 | 8/2009 |
| EP | 0154953 | 9/1985 |
| EP | 1521235 | 4/2005 |
| EP | 1579733 | 9/2005 |
| JP | 2-78393 | 3/1990 |
| JP | 2003-346530 | 12/2003 |
| JP | 2004-325647 | 11/2004 |
| JP | 2006-114909 | 4/2006 |
| JP | 2007-058209 | 3/2007 |
| JP | 2008-507735 | 3/2008 |

(56) References Cited

FOREIGN PATENT DOCUMENTS

| | | |
|---|---|---|
| JP | 2008-096547 | 4/2008 |
| JP | 2008-538145 | 10/2008 |
| JP | 2009-251129 | 10/2009 |
| JP | 2009-267239 | 11/2009 |
| JP | 2010-525555 | 7/2010 |
| JP | 2012-500996 | 1/2012 |
| JP | 2012-505435 | 3/2012 |
| JP | 2013-161053 | 8/2013 |
| KR | 2008-0041780 | 5/2008 |
| KR | 2008-0012246 | 2/2011 |
| KR | 2011-0072210 | 6/2011 |
| KR | 10-2011-0082554 | 7/2011 |
| KR | 2012-0078883 | 7/2012 |
| KR | 2013-0000506 | 1/2013 |
| WO | 2004/060024 | 7/2004 |
| WO | 2006/046168 | 5/2006 |
| WO | 2006/107720 | 10/2006 |
| WO | 2007/020556 | 2/2007 |
| WO | 2007/114918 | 10/2007 |
| WO | 2009/041574 | 4/2009 |
| WO | 2009/041594 | 4/2009 |
| WO | 2009/101727 | 8/2009 |
| WO | 2011/031802 | 3/2011 |
| WO | 2012/082825 | 6/2012 |
| WO | 2013/188298 | 12/2013 |
| WO | 2014/025677 | 2/2014 |
| WO | 2014/137565 | 9/2014 |

OTHER PUBLICATIONS

NanocoTechnologies "The Future of Cadmium Free QD Display Technology" Apr. 2011.
Nanosys and LG Close to Bringing Quantun Dot Technology to LCD Displays, Nov. 4, 2010.
Quantum Dot LCD HDTV, Dec. 31, 2009.

\* cited by examiner

TECHNIQUES FOR DUAL MODULATION WITH LIGHT CONVERSION

TECHNOLOGY

The present invention relates generally to display techniques, and in particular, to display techniques for dual modulation with light conversion.

BACKGROUND

Color filter arrays in liquid crystal displays (LCDs) and organic light-emitting diode (OLED) displays are commonly produced by photolithographic techniques, or printing techniques, as part of the LCD and OLED panel production process. Color filters in emissive displays such as LCD and OLED displays typically consist of red, green and blue filters. The color filters are patterned over the pixel array to allow the pixel elements to modulate the emitted light by color, as well as by intensity. In operation, a broadband light source (e.g., white light) provides light to pixel elements, for example, in LCD display systems. Alternatively, broadband light is created by white OLED pixel elements in OLED display systems. A pixel element can vary the intensity of the broadband light transmitting out of the pixel element. The intensity modulated broadband light of each pixel element can be further color filtered by overlaying color filters. Considerable light is wasted by color filters because, for example, in order to produce red light spectrum (e.g., about 620-740 nanometers), then green light (e.g., about 520-570 nanometers) spectrum and blue light spectrum (e.g., about 450-495 nanometers) of the broadband light source would be blocked. Additionally, this wasted light is converted into harmful heat which degrades the performance and lifetime of the display system.

Thus, engineering a display system with wide color gamut and high luminance has been recognized as a costly endeavor by many display manufactures. Because of a high number of relatively expensive optical, audio, electronic and mechanical components involved and the complexity in integrating all of them into a single system, the cost of manufacturing a praiseworthy display system is typically very high.

Accordingly, it is seen by the inventors here that a dual modulation display with light conversion can provide many performance benefits over conventional techniques employing color filters. Additionally, as discovered by the inventors, introduction of light conversion to a local dimming display architecture results in color non-uniformity color. Techniques to compensate for color non-uniformity, particularly for a white light local dimming display, are provided.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

SUMMARY OF THE DESCRIPTION

Methods and apparatuses for driving a dual modulation display (also referred to herein as a local dimming display) are provided. Illumination sources emit first light onto a light conversion layer. The light conversion layer converts the first light into second light. Modulation drive signals to determine transmission of the second light can be adjusted based, in part, on one or more light field simulations.

As an embodiment of the present invention, driving a local dimming display includes generating backlight drive signals to drive individually controllable illumination sources. The illumination sources emit first light onto a light conversion layer. The light conversion layer converts the first light into second light. The light conversion layer can include quantum dots (QD) or phosphor materials. Modulation drive signals are generated to determine transmission of the second light through individual subpixels of the display. These modulation drive signals can be adjusted based on one or more light field simulations. The light field simulations can address: (i) a resulting color shift for a pixel based on a point spread function of the illumination sources; (ii) binning difference of individual illumination sources; (iii) temperature dependence of display components on performance; or (iv) combinations thereof.

As another embodiment of the present invention, a method for driving a local dimming display includes generating, based on image data, backlight drive signals to drive individually controllable, light emitting diode (LED) sources of a backlight. The individually controllable LED sources emit a first light onto a quantum dot layer, which converts at least a portion of the first light (as well as, optionally, recycled light within the display) into second light. LCD modulation drive signals, regulating transmission of the second light through individual subpixels of the display by an LCD array, are determined. An increase in yellow light spectral components for a pixel based upon one or more of the backlight drive signals and respective distances between the pixel and one or more LED sources is determined. The LCD modulation drive signal for at least one subpixel of the pixel is adjusted to reduce yellow light spectral components when rendering the pixel.

As yet another embodiment of the present invention, a display system includes one or more illumination sources of a backlight configured to emit first light. The first light can include ultraviolet (UV) spectral components (e.g., about 10-400 nanometers) and/or blue light spectral components. The display further includes one or more light conversion layers configured to be stimulated by the first light and to convert at least a portion of the first light into second light. Light modulators are configured to modulate an amount of second light transmitted through individual subpixels of the display system. Logic computes one or more light field simulations for (i) color shifts as a function of a backlight point spread function, (ii) a difference between a performance characteristic of an illumination source of the one or more illumination sources of the backlight and a performance characteristic of the backlight, (iii) temperature variance for a rendered pixel, or combinations thereof. A controller can adjust drive values for the one or more light modulators based on the light field simulation.

As another embodiment of the present invention, driving a dual modulation display includes generating backlight drive signals for individually-controllable illumination sources. The illumination sources emit first light, such as ultraviolet or blue light, onto a light conversion layer. The light conversion layer converts the first light into second light, such as white light. The light conversion layer can include quantum dot materials. Intermediate liquid crystal display (LCD) modulation drive signals are determined based on one or more light field simulations, which assumes little or no spatial color shift. These intermediate LCD modulation drive signals can be adjusted based on one or more color field simulations to account for non-uniform, spatial color shifts resulting from using the light conversion layer.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE POSSIBLE EMBODIMENTS

The following description and drawings are illustrative of the invention and are not to be construed as limiting the invention. Numerous specific details are described to provide a thorough understanding of the invention. However, in certain instances, well known or conventional details are not described in order to avoid obscuring the description of the invention. Additionally, details from U.S. patent application Ser. No. 14/370,115, entitled "Techniques for Dual Modulation Display with Light Conversion," is hereby incorporated by reference for all purposes.

Figure 1:
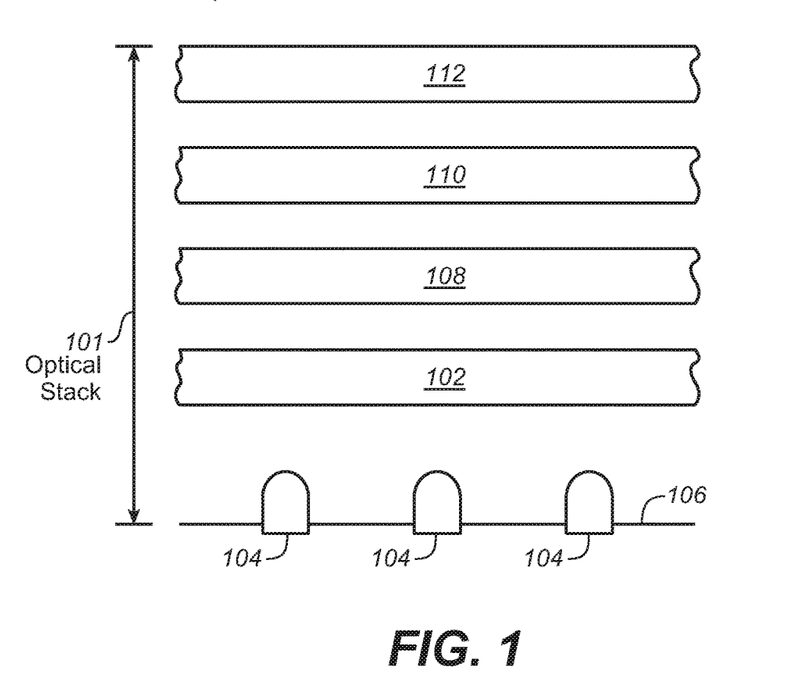
FIG. 1 illustrates an exemplary color array panel comprising a conversion layer.

FIG. 1 illustrates an exemplary color array panel 100 comprising an optical stack 101. Optical stack 101 can include, without limitation:
  i. conversion layer 102;
  ii. illumination sources 104;
  iii. reflector surface 106;
  iv. diffuser layer 108;
  v. light recycling film 110; and
  vi. light modulation layer 112.

Conversion layer 102, disposed in front (from a viewer's perspective) of illumination sources 104, can comprise quantum dot or phosphor materials. Quantum dot (e.g., nano-scale particles using a quantum confinement effect for light emission) or phosphor materials can be coated, attached to, doped, or otherwise disposed on a top surface, bottom surface, or both surfaces of an optical layer to form conversion layer 102. Quantum dot or phosphor materials may also be embedded within the optical layer. These materials may be disposed with the optical layer in any combination or order of various disposition methods.

Conversion layer 102, using quantum dot color arrays or phosphor color arrays, impart colors in a color display system. A red quantum dot or phosphor material absorbs light of higher energies or shorter wavelengths such as green and blue light and emits red light. A green quantum dot or phosphor material absorbs blue light and emit green light. Accordingly, as an embodiment of the present invention, conversion layer 102 produces desired colors: red and green light converted from a blue light source; while blue light is emitted from the blue light source directly.

In an embodiment of the present invention, conversion layer 102 is a single sheet (or, alternatively, multiple of segments arranged to form a single plane) extending, in width and height, to be substantially equal to dimensions of an active area of the display device. For example, conversion layer 102 can measure, diagonally, about 4 inches, 10 inches, 32 inches, 40 inches, 50 inches, 58 inches or more. Additionally, conversion layer 102 can have an aspect ratio, or the proportional relationship between width and height, of 16:9, 4:3, 3:2, 5:3, 5:4, or 1:1, among others. As illustrated in FIG. 1, conversion layer 102 is disposed away from illumination source 104. In an alternative embodiment of the present invention, conversion layer 102 comprises a plurality of segments. In a specific embodiment, each segment of the plurality of segments is associated with a single illumination source 104.

Illumination sources 104 can be any source of electromagnetic energy useable by conversion layer 102 to produce perceptible light for human or machine vision. For example, illumination sources 104 can include one or more of OLED, RGB LED, broadband LED, blue spectrum LED, ultraviolet spectrum LED, or the like.

These illumination sources 104 can be arranged as an array extending substantially the length and height of the active area of the display device. The pitch density between illumination sources 104 can equal or correspond to the pixel resolution of the display. That is to say, the ratio of illumination sources 104 to the number of pixel can be 1:1 (e.g., 1920×1080, 3840×2160, or 7680×4320 illumination sources for respective display resolution). In this case, the position of each of the illumination sources 104 can be directly aligned behind (from viewer's perspective) a corresponding pixel. In other cases, illuminations sources 104 can be disposed with a lateral offset from a corresponding pixel or between two pixels. The pitch between illuminations sources 104 can be uniform or non-uniform, for example, pitch density can be higher in proximity to a central active area of display than in a periphery, edges, corners, or black borders in letterbox format.

In other embodiments, the ratio between of illumination sources 104 to the number of pixel can be lower, such as 1:2, 1:3, 1:4, 1:10, or more. In this case, the resolution of the backlight image will be decreased. Alternatively, the ratio can be higher, such as 2:1, 3:1, or less. For example, an illumination source can be associated with a subpixel, instead of a pixel or group of pixels.

These illumination sources 104 are individually controlled or, alternatively, a subset of them can be collectively controlled in unison. The flexibility of backlight control through individually controllable illumination sources 104 permits local dimming Additional details about local dimming can be found in U.S. Pat. No. 8,277,056, entitled "Locally Dimmed Display," which is hereby incorporated by reference in its entirety for all purposes. However, despite individual control of illumination sources 104, the PSF for each of illumination sources 104 can overlap to contribute to the intensity of a plurality of pixels.

Although FIG. 1 illustrates a direct-lit backlight display, an edge-lit display can also enjoy the benefits of the inventions taught in this disclosure (e.g., compensation for color shift from PSF, illumination source binning, or temperature variance). In such an embodiment, a spatial light modulator illuminated by one or more light sources positioned at an edge of the spatial light modulator. Additional details about edge-lit, local dimming can be found in U.S. Pat. No. 8,172,401, entitled "Edge Lit Locally Dimmed Display," which is hereby incorporated by reference in its entirety for all purposes.

Reflector surface 106 can be a broadband mirror surface, dichroic mirror surface reflecting a predetermined spectrum (e.g., one or more primary colors). Further, reflector surface 106 can include through-holes for illumination sources 104. These through-holes can be reamed, drilled, or milled. Reflector surface 106 redirects light back through the optical stack 101 for increased efficiency.

In FIG. 1, diffuser layer 108 scatters outgoing light through a range of directions so that a viewer located on an opposite side of diffuser 108 perceives light to originate from an increased area. In general, diffuser 108 can scatter light to a different angular extent in the horizontal and vertical planes.

Light recycling film 110 is used to boost the optical efficiency of backlighting. In some embodiments, as light modulation layer 112 can only (or substantially only) pass polarized light and that the backlight essentially produces unpolarized light. A reflective polarizer (e.g., 3M DBEF) can be used as the last optical layer before light modulation layer 112. Light of the wrong polarization incident on the light modulation layer 112, which would otherwise be absorbed, is reflected back by the light recycling film 110 towards the backlight. The reflected light would be scattered in diffuser layer 108 which randomizes the polarization. The reflected light having randomized polarization, which has a fraction of the correct polarization to pass through the light modulation layer 112, can be redirected toward the light modulation layer 112 as it scatters and bounces in the optical stack.

Another light recycling film 110 can be a prismatic structured film (e.g., 3M BEF) which is used to control the direction of light exiting the backlight unit. To maximize the intensity of light within the viewing angle of light modulation layer 112, light outside of the viewing angle can be reflected back into the optical cavity which after scattering and reflection can result in a fraction of the reflected light having the desired exiting angle within viewing angle.

Light modulation layer 112 may comprise, for example, (i) an LCD panel, which is an example of a transmission-type light modulator, (ii) a deformable mirror device (DMD), which is an example of a reflection-type light modulator, or (iii) a micro-electro-mechanical system (MEMS) based modulator. The elements of light modulator 112 are controlled according to data which defines an image being displayed.

It should be appreciated that FIG. 1 illustrates an embodiment of optical stack 101, and the arrangement of elements therein can vary or can include additional elements not described. For example, light recycling film 110 can be disposed behind diffuser layer 108, rather than in front of it. As yet another example, conversion layer 102 can be disposed anywhere within optical stack 101 after illumination sources 104. All such modifications and variations are intended to be included within the scope of this disclosure.

Figure 2A:
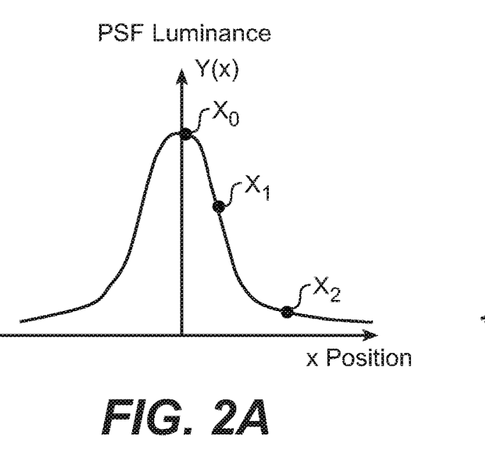
FIGS. 2A, 2B and 2C illustrate an example PSF having a color shift as a function of distance from center.
Figure 2B:
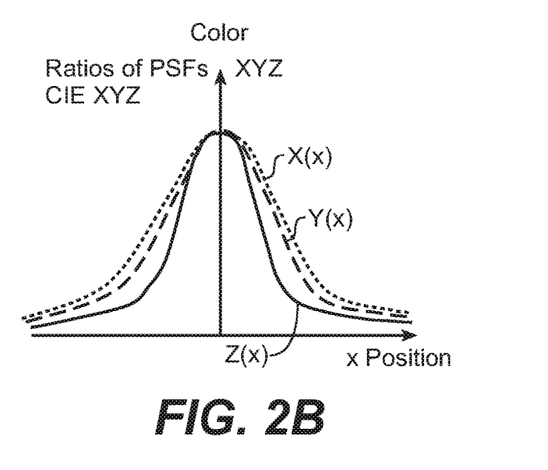
Figure 2C:
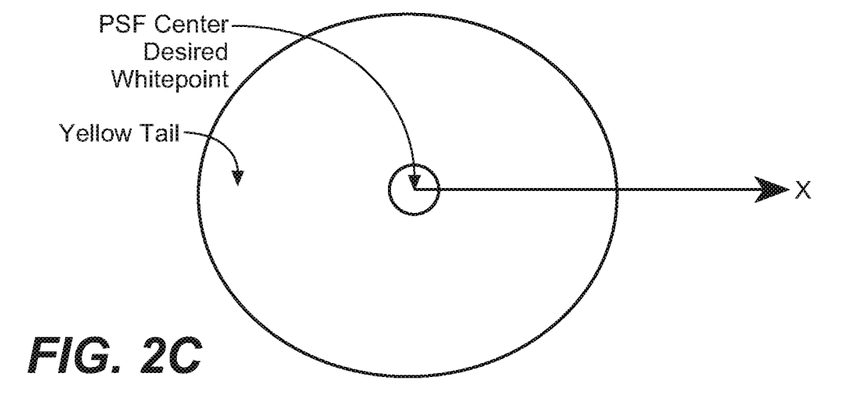
Figure 2D:
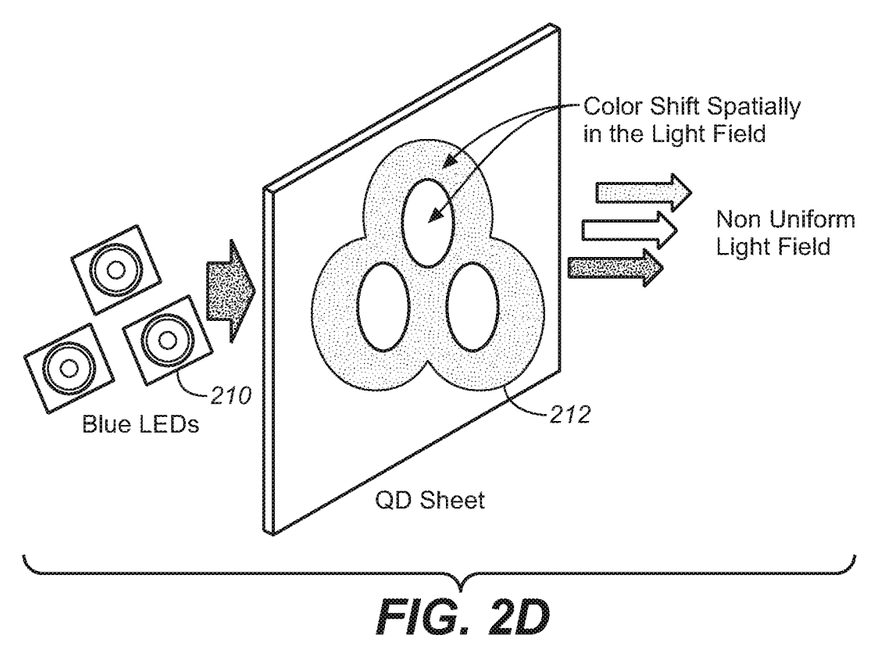
FIG. 2D illustrates an example PSF having a spatially varying color shift for backlight of blue LEDs.

As appreciated by the inventors here, exemplary color array panel 100 suffers from a "yellow tail effect," or a point spread function (PSF) that shifts colors as a function of distance from center. That is to say, light traveling a relatively long optical path, redirected back to spatial regions close to or in light sources, can be spatially spread into wide angles and areas, and cause color shifts (e.g., yellow tails)—particularly with light recycling with one or more reflections. In such a system, for example, the light in the center of a point spread function of a direct-lit light emitter would be mostly converted, but rejected light components can bounce back in and convert with less green and red as the distance from the center of the point spread function of the light emitter to outer circumferences increases, giving rise to a color shift to the point spread function (PSF). The PSF tail becomes increasingly yellow even when the PSF center has a desired white point. Without the presence of compensation, color shift degradation may be especially noticeable or even visually prominent. FIGS. 2A, 2B and 2C, as simple illustrations, show the yellow tail effect. FIG. 2D illustrates an example PSF having a spatially varying color shift for backlight of blue LEDs.

Figure 3:
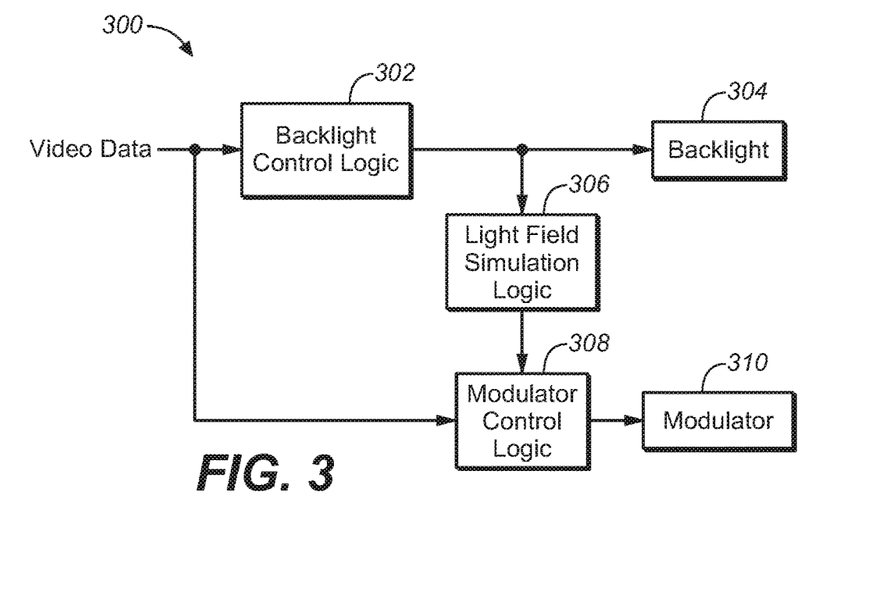
FIG. 3 illustrates an exemplary configuration of display logic in a display system.

FIG. 3 illustrates an exemplary configuration of display logic in a display system 300. In accordance with some possible embodiments of the present invention, display system 300 includes backlight control logic 302 to control illumination sources in backlight 304. These illumination sources may be same or similar to illumination sources 104 shown in FIG. 1. Backlight control logic 302 can be operatively coupled with an image data source (not shown) (e.g., a set-top box, networked server, storage media or the like) and is configured to receive image data from the image data source. Image frames received or generated from image data from an internal or external source may be used by the backlight control logic 302 to drive the backlight 304. For example, backlight control logic 302 may be configured to control backlight 304 to illuminate one or more pixels or sub-pixels with a specific intensity. The image frames may be used by the backlight control logic 302 to derive individual or aggregate drive values in various frames in various resolutions.

In this embodiment of the present invention, backlight control logic 302 is logically coupled to light field simulation logic 306. Light field simulation logic 306 computes one or more influences on the light field, such as, for example, the yellow tail effect, illumination source binning, temperature dependence on system components and the like. Based on these influences, light field simulation logic 306 and/or modulator control logic 308 (e.g., LCD panel control logic) can mitigate them for improved picture quality. For example, to mitigate the yellow tail effect, drive values to the modulator 310 (e.g., an LCD panel) can be biased to be more blue.

In one embodiment, a light field simulation can utilize nine convolution channels representing three color tristimulus values for each of the three primary colors. However, this is computationally expensive. As an alternative, the light field simulation can model the individually controllable illumination sources of the backlight as having a first PSF for broadband light spectral components and a second PSF for yellow light spectral components—or two convolution channels, not nine. The first PSF is narrower than the overlapping second PSF from the yellow tail effect.

Light field simulation logic 306 can include a convolution channel to compensate for binning (lack or insufficiency thereof) of backlight LEDs (e.g., illumination sources 102). For a broadband backlight, white LEDs, constructed with blue LED dies and yellow phosphor (e.g., YAG phosphor), can be used. However, binning variation of white LEDs with wide performance ranges can reduce display accuracy and uniformity. In particular, the yellow phosphor material on each blue LED die can vary causing a differing white point. The yellow phosphor on each blue LED die can also have varying spectral emission. Similarly, in an embodiment exclusively using UV and/or blue spectral components for backlighting, these UV or blue LEDs can have different intensity for constant power or vary in emission spectrums.

As embodiment of the present invention, light field simulation logic 306 can be used to compensate for temperature dependence of display performance with additional convolution channels. For example, derating function(s) can be used to account, either individually or collectively, for temperature dependence of illumination sources or a conversion layer. As another example, a temperature dependent point spread function can be used to address optical sheet warping. In a specific embodiment, one or more temperature measurements can be taken from one or more sensors (disposed within the optical stack) or temperature can be inferred by a display characteristic (e.g., performance change over time).

Figure 4:
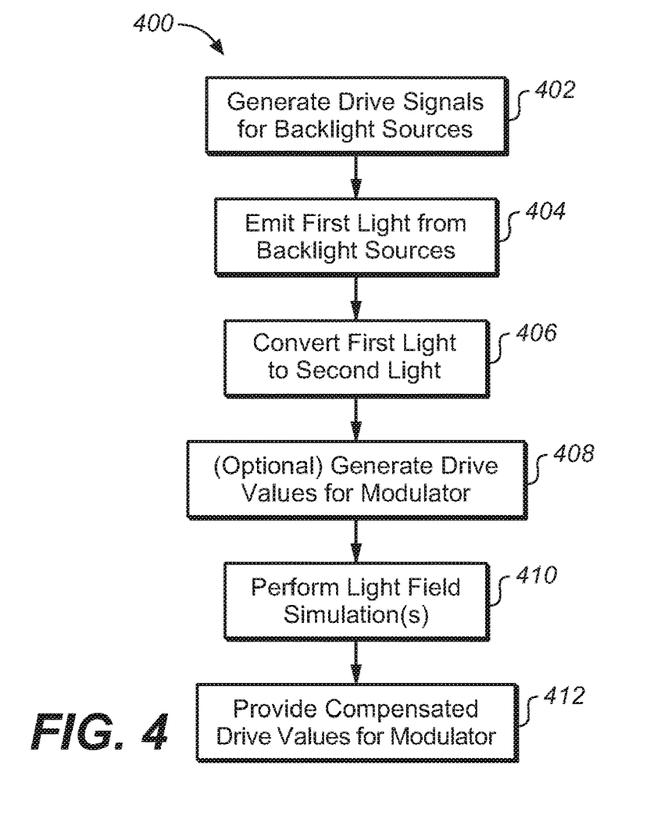
FIG. 4 illustrates an exemplary flow diagram for driving a local dimming display.

FIG. 4 illustrates an exemplary flow diagram 400 for driving a local dimming display. In step 402, drive signals for the backlight (e.g., illumination sources 104) can be generated. The driven backlight produces a first light, in step 404. The first light can be a broadband light (e.g., white light), UV spectral components, blue spectral components, or any portion of the spectrum. As shown in step 406, first light is converted into a second light. For example, a conversion layer receives the first light produces second light with desired colors (e.g., red or green light).

Next, in step 408, drive values for a modulator (e.g., an LCD panel), preferably a subpixel modulator for each primary color, are generated based on input image data. The results of the one or more light field simulations can be used to adjust, modify or weigh modulator drive values, as reflected in step 412. One or more light field simulations for compensation are performed in step 410. As described herein, light field simulations can address, as examples, (i) color shifts as a function of a backlight point spread function, (ii) a difference between a performance characteristic of an illumination source of the one or more illumination sources of the backlight and a performance characteristic of the backlight, (iii) temperature variance on performance, or (iv) combinations thereof.

It is appreciated that flow diagram 400 described herein is for illustrative purposes only and that various modifications or changes in light thereof will be suggested to persons skilled in the art. In alternative implementations, the steps noted in flow diagram 400 may occur out of the order noted in FIG. 4, may include additional steps, and/or may omit some steps altogether. For example, steps 402 and 408 may in fact be executed substantially concurrently or in reverse order. As another example, step 410 can be performed before step 404. All such modifications and variations are intended to be included within the scope of this disclosure.

Embodiments include an apparatus comprising a processor and configured to perform any one of the foregoing methods as discussed above.

Embodiments include a computer readable storage medium, comprising software instructions, which when executed by one or more processors causes performance of any one of the foregoing methods as discussed above.

Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
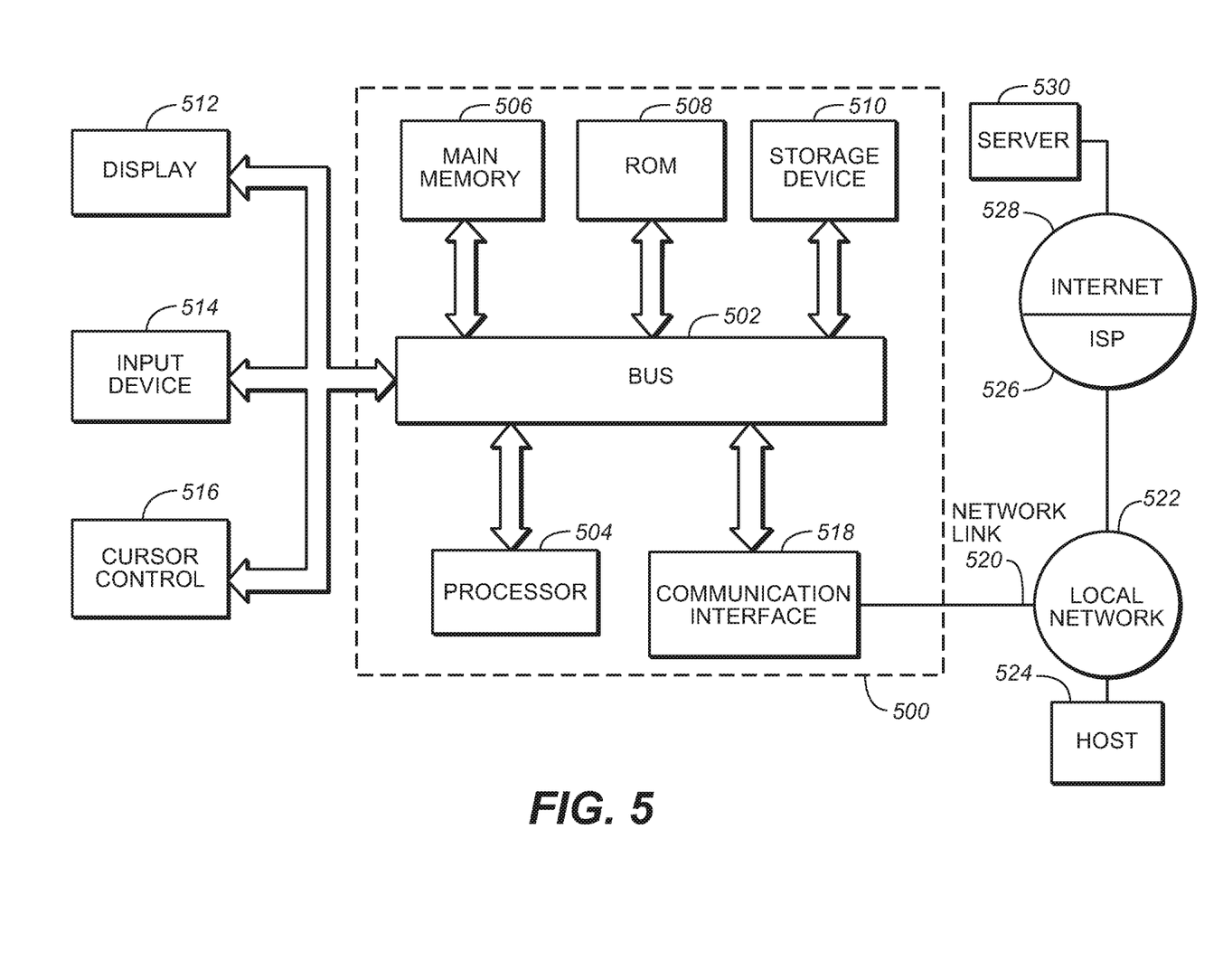
FIG. 5 illustrates an example hardware platform on which a computer or a computing device as described herein may be implemented, according a possible embodiment of the present invention.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Figure 6A:
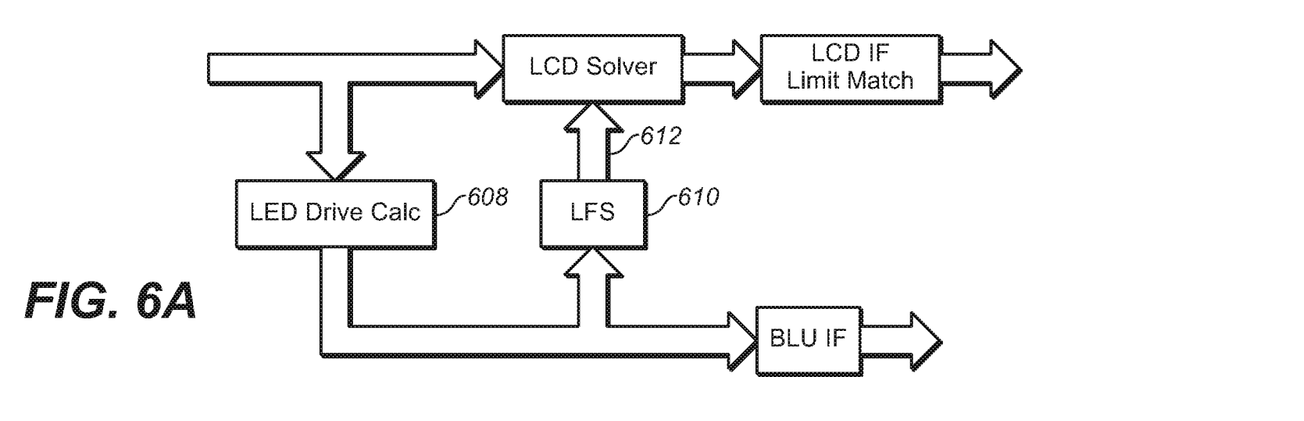
FIGS. 6A and 6B illustrate simplified configurations of local dimming with light conversion.
Figure 6B:
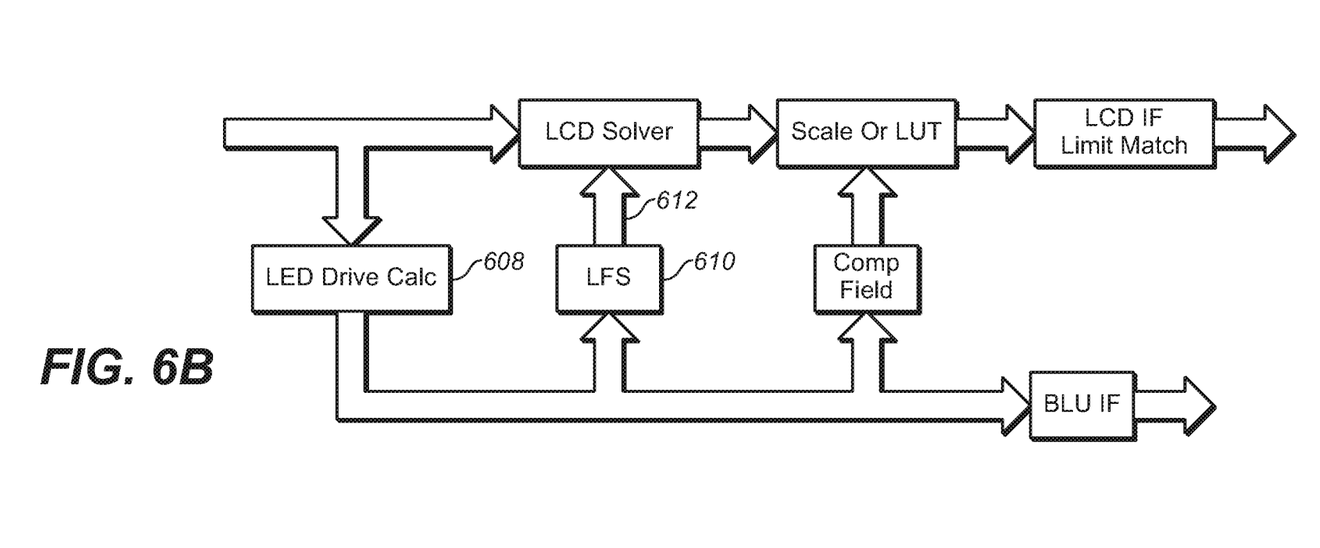

FIG. 6A illustrates a simplified configuration for local dimming with light conversion. FIG. 6B illustrates a simplified configuration for local dimming with light conversion with compensation for spatial color non-uniformity.

In one or more embodiments of the present invention, techniques for QD local dimming mitigates a variance in color point spread function (PSF) across the screen. This can be done mathematically accurately by creating multiple light field simulations to change the parameters on an LCD solving matrix. A typical implementation can use nine light field simulations; however, for consumer applications, a perfect mathematical solution is generally not needed.

As a particular embodiment of the present invention, logic 608 determines one or more drive signals controlling backlight illumination sources. Based on these drive signals backlight illumination sources (e.g., LEDs, LED 210) emit first light (e.g., broad spectrum white light, blue light, ultraviolet light) onto one or more light conversion layers (e.g., quantum dot layers, QD sheet 212, or the like).

Based on the teachings herein, a backlight algorithm for light field simulation 610, where the PSF is assumed to result in a uniform white light, defines a first path 612 for intermediate LCD drive values. An additional path corrects for variations from a white, uniform solution to reduce spatial color non-uniformity.

As a further example, instead of corrections to the matrix, compensation logic 614 can spatially scale the red, green, and blue primaries, in the case of an RGB system. Alternatively to scaling, compensation logic 614 can be accomplished by a suitable lookup table (LUT), e.g., a one dimensional, two dimensional, or three dimensional LUT. Compensation can be determined for one or more color components.

EQUIVALENTS, EXTENSIONS, ALTERNATIVES AND MISCELLANEOUS

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense. Numerous modifications and variations of the invention are possible in light of the above teachings. Any definitions expressly set forth herein for terms contained in such claims shall govern the meaning of such terms as used in the claims. It should be further understood, for clarity, that exempli gratia (e.g.) means "for the sake of example" (not exhaustive), which differs from id est (i.e.) or "that is."

The invention claimed is:
1. A display device, comprising:
one or more illumination sources configured to emit first light;

a light conversion layer configured to convert the first light into second light;

a light modulator configured to modulate the second light for display; and a controller configured to determine intermediate display modulation drive signals for the light modulator and compensate for a spatial color non-uniformity by adjusting the intermediate display modulation drive signals.

2. The display device of claim 1, wherein the spatial color non-uniformity relates to traveling distances of light from the one or more illumination sources.

3. The display device of claim 1, wherein the traveling distances account for one or more reflections.

4. The display device of claim 1, wherein the light conversion layer is configured to convert the first light of a first frequency range into the second light of a second frequency range.

5. The display device of claim 1, wherein the light conversion layer includes quantum dot materials.

6. The display device of claim 5, wherein the quantum dot materials form a sheet.

7. The display device of claim 5, wherein the quantum dot materials of the light conversion layer comprise a plurality of segments.

8. The display device of claim 1, wherein the display device is an LCD (liquid crystal display) display device, an LED (light-emitting diode) display device, an OLED (organic light-emitting diode) display device, or a projector.

9. The display device of claim 1, wherein the light modulator is an LCD modulator, a deformable mirror device, or a micro-electro-mechanical device.

10. The display device of claim 1, wherein the one or more illumination sources are individually controllable.

* * * * *